United States Patent
Kim et al.

(10) Patent No.: US 9,935,472 B2
(45) Date of Patent: Apr. 3, 2018

(54) BATTERY PACK

(71) Applicant: Samsung SDI Co., Ltd., Yongin-si, Gyeonggi-do (KR)

(72) Inventors: Bong-Young Kim, Yongin-si (KR); Susumu Segawa, Yongin-si (KR); Hidaka Takao, Yongin-si (KR)

(73) Assignee: Samsung SDI Co., Ltd., Gyeonggi-do (KR)

(*) Notice: Subject to any disclaimer, the term of this patent is extended or adjusted under 35 U.S.C. 154(b) by 114 days.

(21) Appl. No.: 14/735,363

(22) Filed: Jun. 10, 2015

(65) Prior Publication Data

US 2016/0156204 A1 Jun. 2, 2016

(30) Foreign Application Priority Data

Nov. 27, 2014 (KR) .......................... 10-2014-0167453

(51) Int. Cl.
*H02J 7/00* (2006.01)

(52) U.S. Cl.
CPC .......... *H02J 7/0021* (2013.01); *H02J 7/0026* (2013.01); *H02J 7/0029* (2013.01); *H02J 2007/0039* (2013.01); *Y02T 10/7055* (2013.01)

(58) Field of Classification Search
CPC .................................................. H02J 7/0021
USPC ......................................... 320/116–119, 162
See application file for complete search history.

(56) References Cited

U.S. PATENT DOCUMENTS

| | | | |
|---|---|---|---|
| 5,804,944 A | 9/1998 | Alberkrack et al. | |
| 5,889,385 A * | 3/1999 | Podrazhansky | H02J 7/0016 320/130 |
| 2006/0012336 A1* | 1/2006 | Fujita | H02J 7/0021 320/119 |
| 2006/0043936 A1 | 3/2006 | Kim | |
| 2011/0313613 A1* | 12/2011 | Kawahara | H01M 10/441 701/34.4 |
| 2012/0056598 A1* | 3/2012 | Kim | H02J 7/0031 320/136 |
| 2014/0176080 A1* | 6/2014 | Chung | H02J 7/0063 320/134 |

FOREIGN PATENT DOCUMENTS

| | | |
|---|---|---|
| KR | 10-2001-0006107 A | 1/2001 |
| KR | 10-2006-0021067 A | 3/2006 |

* cited by examiner

*Primary Examiner* — Drew A Dunn
*Assistant Examiner* — Zixuan Zhou
(74) *Attorney, Agent, or Firm* — Knobbe Martens Olson & Bear LLP

(57) ABSTRACT

A battery pack is disclosed. In one aspect, the battery pack includes a battery unit including a plurality of main battery cells and an additional battery cell. The battery pack also includes a battery management system (BMS) configured to receive voltage information about the battery unit and control charging and discharging of the battery unit. The BMS includes at least one voltage measuring terminal configured to receive main voltage information about the main battery cell and an analog to digital converting terminal configured to receive additional voltage information about the additional battery cell.

15 Claims, 2 Drawing Sheets

BATTERY PACK

CROSS-REFERENCE TO RELATED APPLICATION

This application claims priority to and the benefit of Korean Patent Application No. 10-2014-0167453, filed on Nov. 27, 2014, in the Korean Intellectual Property Office, the entire contents of which are incorporated herein by reference in their entirety.

BACKGROUND

Field

The described technology generally relates to a battery pack, and particularly, to a battery pack including a battery management system (BMS).

Description of the Related Technology

The use of portable electronic devices such as mobile phones, digital cameras, and notebook computers is increasingly widespread, and thus, research into developing improved batteries which power these devices is ongoing. Further, high-capacity battery systems such as those used in electric vehicles, uninterruptible power supplies (UPS s), or energy storing systems are also undergoing active research and development.

SUMMARY OF CERTAIN INVENTIVE ASPECTS

One inventive aspect is a battery pack having a BMS that can control a greater number of batteries than the number of batteries that the BMS is designed to control by using an analog digital converting port of the battery management unit.

Another aspect is a battery pack, including: a battery unit including a plurality of main battery cells and an additional battery cell; and a BMS configured to receive voltage information about the battery unit and control a charge/discharge operation of the battery unit, and receive the voltage information about the main battery cell through a voltage measuring terminal and the voltage information about the additional battery cell through an analog to digital converting terminal.

The BMS can include the voltage measuring terminal corresponding to each of the plurality of main battery cells.

The battery pack can further include a voltage measuring unit configured to output the voltage information generated by measuring a voltage of each of the plurality of main battery cells to the voltage measuring terminal.

The battery pack can further include an auxiliary measuring unit configured to measure a voltage of the additional battery cell as a divided voltage, and output the divided voltage to the analog to digital converting terminal as the voltage information.

The auxiliary measuring unit can include: a divided resistor unit formed of a plurality of resistors and configured to output the divided voltage; and a switching element configured to connect the additional battery cell and the divided resistor unit according to a control signal output from the battery management unit.

The battery pack can further include a protection circuit configured to generate an output voltage in response to a control signal output from the battery management unit, in which the BMS compares the output voltage and an internally used reference voltage, and determines whether the BMS has a problem.

The protection circuit can be configured as a current mirror circuit.

The protection circuit can include: a zener diode configured to clamp external power; and resistors connected to both ends of the zener diode and configured to divide a clamping voltage of the zener diode into the output voltage and output the divided output voltage.

Another aspect is a battery pack, including: a battery unit including a plurality of battery cells; a BMS configured to control a charge operation of the battery unit by using external power; and a protection circuit configured to output an output voltage having a predetermined level to the BMS by using the external power, in which the BMS compares an internal reference voltage and the output voltage, checks whether the reference voltage is changed, and determines whether the BMS has a problem.

The protection circuit can be configured as a current mirror circuit.

The protection circuit can include: a zener diode configured to clamp external power; and resistors connected to both ends of the zener diode and configured to divide a clamping voltage of the zener diode into the output voltage and output the divided output voltage.

The battery unit can include a plurality of main battery cells and an additional battery cell.

The BMS can receive voltage information about the battery unit and control a charge/discharge operation of the battery unit, and receive the voltage information about the main battery cell through a voltage measuring terminal and the voltage information about the additional battery cell through an analog to digital converting terminal.

The BMS can include the voltage measuring terminal corresponding to each of the plurality of main battery cells.

The battery pack can further include a voltage measuring unit configured to output the voltage information generated by measuring a voltage of each of the plurality of main battery cells to the voltage measuring terminal.

The battery pack can further an auxiliary measuring unit configured to measure a voltage of the additional battery cell as a divided voltage, and output the divided voltage to the analog to digital converting terminal as the voltage information.

Another aspect is a battery pack comprising a battery unit including a plurality of main battery cells and an additional battery cell; and a battery management system (BMS) configured to: i) receive voltage information about the battery unit and ii) control charging and discharging of the battery unit, wherein the BMS comprises: i) at least one voltage measuring terminal configured to receive main voltage information about the main battery cells and ii) an analog to digital converting terminal configured to receive additional voltage information about the additional battery cell.

In exemplary embodiments, at least one voltage measuring terminal comprises a plurality of voltage measuring terminals respectively corresponding to the main battery cells. The battery pack can further comprise a voltage measuring unit configured to i) measure a voltage of each of the main battery cells and ii) output the main voltage information to the voltage measuring terminal based on the measured voltages. The battery pack can further comprise an auxiliary measuring unit configured to: i) measure a voltage of the additional battery cell and ii) output the additional voltage information to the analog to digital converting terminal based on the measured voltage.

In exemplary embodiments, the auxiliary measuring unit comprises a voltage divider including a plurality of resistors, wherein the voltage divider is configured to divide the voltage of the additional battery cell so as to generate the additional voltage information; and a switching element configured to electrically connect the additional battery cell to the voltage divider based on a control signal received from the battery management unit.

In exemplary embodiments, the battery pack further comprises a protection circuit configured to generate an output voltage based on a control signal received from the battery management unit, wherein the BMS is configured to: i) compare the output voltage to an internally used reference voltage and ii) determine whether an abnormality has occurred in the BMS based on the comparison. The protection circuit can comprise a current mirror circuit. The protection circuit can comprise a zener diode configured to suppress power received by the protection circuit; and a pair of resistors connected in series between the ends of the zener diode and configured to divide the voltage across the zener diode into the output voltage.

Another aspect is a battery pack comprising a battery unit including a plurality of battery cells; a battery management system (BMS) configured to control charging and discharging of the battery unit; and a protection circuit configured to output an output voltage having a predetermined level to the battery management unit, wherein the BMS is configured to: i) compare an internal reference voltage to the output voltage, ii) determine whether the internal reference voltage has changed based on the comparison, and iii) determines whether an abnormality has occurred in the BMS based on whether the internal reference voltage has changed.

In exemplary embodiments, the protection circuit comprises a current mirror circuit. The protection circuit can include a zener diode configured to suppress power received by the protection circuit; and a pair of resistors connected in series between the ends of the zener diode and configured to divide the voltage across the zener diode into the output voltage. the battery unit can include a plurality of main battery cells and an additional battery cell.

In exemplary embodiments, the BMS comprises at least one voltage measuring terminal configured to receive main voltage information about the main battery cell; and an analog to digital converting terminal configured to receive additional voltage information about the additional battery cell. the at least one voltage measuring terminal can comprise a plurality of voltage measuring terminals respectively corresponding to the main battery cells. The battery pack can further comprise a voltage measuring unit configured to: i) measure a voltage of each of the main battery cells and ii) output the main voltage information to the voltage measuring terminal based on the measured voltages. The battery pack can further comprise an auxiliary measuring unit configured to: i) measure a voltage of the additional battery cell and ii) output the additional voltage information to the analog to digital converting terminal based on the measured voltage.

According to at least one exemplary embodiment, it is possible to control N+1 batteries by using a battery management unit, which is capable of controlling N batteries, thereby reducing the manufacturing cost of a battery pack and improving stability of the BMS via an additional protection circuit.

DETAILED DESCRIPTION OF CERTAIN INVENTIVE EMBODIMENTS

Figure 1:
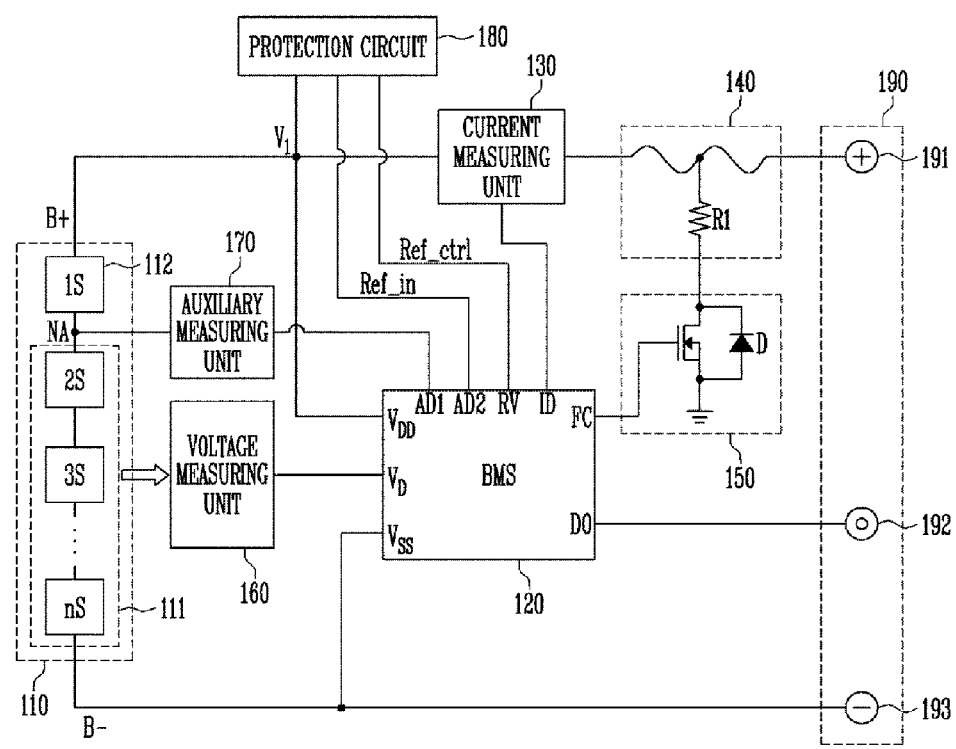
FIG. 1 is a block diagram illustrating a battery pack according to an exemplary embodiment.

Example embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully enable those skilled in the art to make and practice the described technology.

In the drawings, the dimensions of the illustrated components may be exaggerated for the sake of clarity. It will be understood that when an element is referred to as being "between" two elements, it can be the only element between the two elements, or one or more intervening elements may also be present. Like reference numerals refer to like elements throughout.

Various advantages and features of the described technology and methods accomplishing the same will become apparent from the following description of embodiments with reference to the accompanying drawings. However, the described technology is not limited to the exemplary embodiments described herein, and may be specified in other forms.

Throughout this specification and the claims that follow, when it is described that an element is "connected" or "coupled" to another element, the element may be "directly connected" or "directly coupled" to the other element or "electrically connected" or "electrically coupled" to the other element through a third element. Throughout the specification and the claims, unless explicitly described to the contrary, the word "comprise" and variations such as "comprises" or "comprising" will be understood to imply the inclusion of stated elements but not the exclusion of any other elements.

FIG. 1 is a diagram illustrating a battery pack according to an exemplary embodiment.

Referring to FIG. 1, the battery pack 100 includes a battery unit 110, a battery management system (BMS) or battery management unit 120, a current measuring unit 130, a fuse 140, a fuse control switch 150, a voltage measuring unit 160, an auxiliary measuring unit 170, a protection circuit 180, and a terminal unit 190.

The battery unit 110 includes a plurality of battery cells 1S to nS and the battery cells 1S to nS is serially connected between a positive electrode terminal B+ and a negative electrode terminal B−. In certain embodiments, the battery cells 1S to nS include a larger number of battery cells than the maximum number of battery cells that the BMS 120 is designed to control. For example, when the BMS 120 is designed to manage a maximum of five battery cells, the battery unit 110 can include six battery cells. In this embodiment, a number of battery cells corresponding to the optimum management battery cells or the maximum number of battery cells controllable by the BMS 120 are defined as main battery cells 2S to nS and battery cells added to the optimum management battery cells of the BMS 120 are defined as an additional battery cell 1S (112). For example, in order to control N battery cells (N is a natural number larger than 1), the BMS 120 is configured to manage N−1 battery cells.

The battery unit 110 supplies stored power to an electronic device or load to which the battery pack 110 is connected. Further, when a charger is connected to the battery pack 100, the battery unit 110 is charged by an external current. Each of the battery cells 1S to nS can be a chargeable secondary battery, such as a nickel-cadmium battery, a nickel metal hydride (NiMH) battery, a lithium ion battery, or a lithium polymer battery.

The BMS 120 generates a fuse blocking signal that is applied to the fuse blocking switch 150 in order to block the fuse 140. The generated fuse blocking signal is output to the fuse blocking switch 150 through a fuse control terminal FC. Further, the BMS 120 outputs a control signal Ref_ctrl to the protection circuit 180 through an output terminal RV and receives an output voltage Ref_in output from the protection circuit 180 through the analog to digital converting terminal AD2 in response to the control signal Ref_ctrl. The BMS 120 compares an internally used reference voltage and the output voltage Ref_in output from the protection circuit 180 and determines whether an abnormality has occurred in the reference voltage.

Further, the BMS 120 receives voltage information about the main battery cells 2S to nS of the battery unit 110 from the voltage measuring unit 160 through a voltage measuring terminal $V_D$ and determines a charge quantity or state of charge of the battery unit 110 by using the received voltage information. Further, the BMS 120 receives voltage information about the remaining additional battery cell 1S (112) of the battery cells 1S to nS of the battery unit 110, from the auxiliary measuring unit 170 through an analog to digital converting terminal AD1. The BMS 120 includes a voltage measuring terminal $V_D$ corresponding to each of the main battery cells 2S to nS and receives voltage information about the additional battery cell 1S (112) through the analog to digital converting terminal AD1. The BMS 120 can control charging and discharging of the battery unit 110 based on the voltage information about the main battery cells 2S to nS (111) and the additional battery cell 1S (112).

The BMS 120 can transmit data corresponding to the charge quantity or other various data to an external device, for example, an electronic device or a charger, in which the battery pack 100 is mounted, through a data output terminal DO.

The BMS 120 receives a charging current value measured by the current measuring unit 130 through a current measuring terminal ID. The BMS 120 receiving the charging current value can control the current supplied to the battery unit 110 to have a constant voltage or a constant current in response to the charging state of the battery unit 110.

FIG. 1 illustrates that the BMS 120 controls each component of the battery pack 100, but the described technology is not limited thereto. For example, an analog front end (not shown) for controlling each or a portion of the components while monitoring the status of the battery unit 110 can be further included and the BMS 120 can also be configured to control the analog front end.

The current measuring unit 130 is formed on a current path of the battery pack 100 and measures a charging current flowing into the battery unit 110. The current value measured by the current measuring unit 130 is supplied to the BMS 120. FIG. 1 also illustrates that the current measuring unit 130 is formed between the battery 110 and the fuse 140, but the described technology is not limited thereto. That is, the current measuring unit 130 can be positioned at any position at which the charging current flowing into the battery 110 is measurable. For example, the current measuring unit 130 can be positioned inside the BMS 120 to measure the charging current.

The fuse 140 is formed on a high-current path in which a relatively high current flows between the battery unit 110 and the terminal unit 190. When an abnormality has occurred in the battery pack 100, the fuse 140 blocks the high-current path to prevent a discharging current and/or a charging current from flowing. A resistor R1 included in the fuse 140 is connected between the high-current path and ground. When a current having a predetermined size or greater flows through the resistor R1, heat is generated in the resistor R1 so that the fuse 140 blocks the high-current path.

The fuse control switch 150 blocks current from flowing through the fuse 140 when a current flows through the resistor R1 included in the fuse 140. The fuse blocking switch 150 is formed between the fuse 140 and the ground and receives the fuse blocking signal from the BMS 120 to be in an on-state and thus current flows in the resistor R1. The fuse blocking switch 150 can include a Field Effect Transistor (FET) and a diode D.

The voltage measuring unit 160 measures the voltages of the main battery cells 111 of the battery unit 110 and supplies the measured voltage to the BMS 120. The BMS 120 receives the voltages measured by the voltage measuring unit 160 through the voltage measuring terminal $V_D$ and determines a charge quantity of the main battery cells 111 based on the received voltages. In this embodiment, the BMS 120 includes the same number of voltage measuring terminals $V_D$ as the number of main battery cells 111.

The auxiliary measuring unit 170 measures the voltage of the additional battery cell 112 included in the battery unit 110 and supplies the measured voltage to the BMS 120. In this embodiment, the BMS 120 receives the voltage measured by the auxiliary measuring unit 170 through the analog to digital converting terminal AD1. Accordingly, even though the BMS 120 includes only the same number of voltage measuring terminals $V_D$ as the number of main battery cells 111, the BMS 120 can receive the measured voltage of the additional battery cell 112 through the analog to digital converting terminal AD1 and control the additional battery cell 112.

The protection circuit 180 generates the output voltage Ref_in in response to the control signal Ref_ctrl output through the output terminal RV of the BMS 120. The protection circuit 180 outputs the output voltage Ref_in having a predetermined potential level in response to the control signal Ref_ctrl so that the BMS 120 can compare the internally used reference voltage of the BMS 120 to the output voltage Ref_in and detect whether an abnormality has occurred.

The terminal unit 190 connects the battery pack 100 to an external device. Here, the external device may be an electronic device or a charger. The terminal unit 190 includes a positive electrode terminal 191 and a negative electrode terminal 193. A charging current flows into and a discharging current is discharged from the positive electrode terminal 191. By contrast, a charging current is discharged from and the discharging current flows into the negative electrode terminal 193. Further, the terminal unit 190 includes an output terminal 192 which is connected with the data output terminal DO of the BMS 120 and outputs data about a charge quantity of a battery, other various data, or a control signal to the external device.

Additionally, FIG. 1 illustrates only a portion of the configuration of the battery pack 100 and various other components may be added thereto. For example, various components including a charge control switch (not shown)

for controlling a charging current and a discharge control switch (not shown) for controlling a discharging current can be added.

Figure 2:
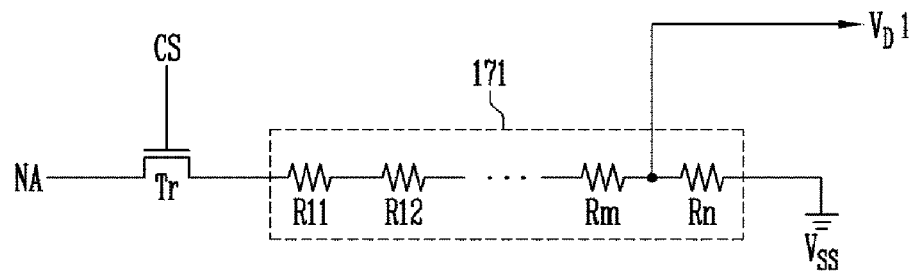
FIG. 2 is a detailed circuit diagram of the auxiliary measuring unit illustrated in FIG. 1.

FIG. 2 is a detailed circuit diagram of the auxiliary measuring unit illustrated in FIG. 1.

Referring to FIG. 2, the auxiliary measuring unit 170 measures a voltage of the additional battery cell 112 illustrated in FIG. 1 as a divided voltage $V_D1$ and outputs the measured voltage to the BMS 120.

The auxiliary measuring unit 170 includes a switching element Tr connected between a node NA between the additional battery cell 112 and the main battery cells 111 and a divided resistor unit or voltage divider 171. The switching element Tr is switched in response to a control signal CS output from the BMS 120 illustrated in FIG. 1 to electrically connect the node NA to the divided resistor unit 171. The divided resistor unit 171 outputs the divided voltage $V_D1$ obtained by dividing the voltage supplied through the node NA according to the resistance values of the divided resistor unit 171. The divided resistor unit 171 can include a plurality of resistors R11 to Rn which are connected between the switching element Tr and a ground voltage $V_{ss}$.

In one exemplary embodiment, the circuit of auxiliary measuring unit 170 is configured as illustrated in FIG. 2, but the circuit is not limited thereto and can include voltage measuring circuits that can measure a voltage of a battery cell.

Figure 3:
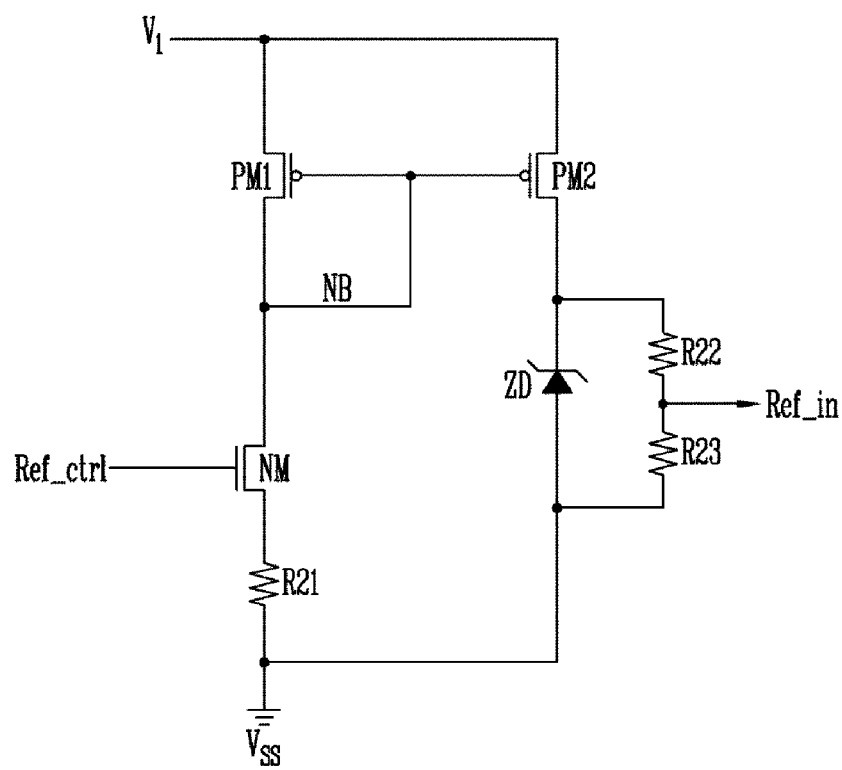
FIG. 3 is a detailed circuit diagram of the protection circuit illustrated in FIG. 1.

FIG. 3 is a detailed circuit diagram of the protection circuit illustrated in FIG. 1.

Referring to FIG. 3, the protection circuit 180 generates the output voltage Ref-In in response to the control signal Ref_ctrl output from the BMS 120. The protection circuit 180 can include a current mirror circuit.

The protection circuit 180 includes a plurality of PMOS transistors PM1 and PM2, an NMOS transistor NM, a plurality of resistors R21 to R23, and a zener diode ZD. The PMOS transistor PM1, the NMOS transistor NM, and the resistor R21 are serially connected between a power supply terminal V1 and a power ground terminal $V_{ss}$. The gate of the PMOS transistor PM1 is connected to a node NB between the PMOS transistor PM1 and the NMOS transistor NM. The NMOS transistor NM adjusts the potential level of the node NB in response to the control signal Ref_ctrl. The PMOS transistor PM2 and the zener diode ZD are serially connected between the power supply terminal V1 and the power ground terminal $V_{ss}$. The gate of the PMOS transistor PM2 is connected to the node NB. The resistors R22 and R23 are serially connected to the ends of the zener diode ZD so as to divide a voltage applied to the zener diode ZD according to the resistance values thereof and output the divided voltage as the output voltage Ref_in.

The protection circuit 180 adjusts the potential level of the node NB in response to the control signal Ref_ctrl and adjusts the amount of current flowing into the zener diode ZD according to the potential level of the node NB. For example, when the potential level of the node NB decreases in response to the control signal Ref_ctrl having a high level, the amount of current flowing through the PMOS transistor PM2 increases and the voltage across the zener diode ZD increases to a set voltage (for example, 5 V). Further, the zener diode ZD can clamp, i.e. suppress, the voltage applied by the power supply terminal V1 to the set voltage when the zener diode ZD is reverse-biased. The voltage can be designed so that an output voltage Ref_in of 1 V is output by adjusting the resistance values of the resistors R22 and R23.

When the reference voltage Ref_ctrl generated in the BMS 120 changes from an expected value due to an abnormality in the BMS 120, the BMS 120 can compare the reference voltage Ref_ctrl and the output voltage Ref_in generated by using an external voltage and detect whether an abnormality has occurred in the BMS 120 to prevent the BMS 120 from being operated under abnormal conditions.

The above-mentioned exemplary embodiments are not embodied only by an apparatus and a method. Alternatively, the above-mentioned exemplary embodiments can be embodied by a program executing functions, which correspond to the configuration of the exemplary embodiments or a recording medium on which the program is recorded. These embodiments can be easily devised from the description of the above-mentioned exemplary embodiments by those skilled in the art to which the described technology pertains.

Exemplary embodiments have been disclosed herein, and although specific terms are employed, they are used and are to be interpreted in a generic and descriptive sense only and not for the purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the invention as set forth in the following claims.

What is claimed is:

1. A battery pack, comprising:
a battery unit including a plurality of main battery cells and an additional battery cell; and
a battery management system (BMS) configured to: i) receive voltage information from the battery unit and ii) control charging and discharging of the battery unit,
wherein the BMS comprises: i) a plurality of voltage measuring terminals configured to receive main voltage information from the main battery cells, the number of voltage measuring terminals being the same as the number of the main battery cells, and ii) an analog to digital converting terminal configured to receive additional voltage information from the additional battery cell,
wherein the BMS is further configured to generate a reference voltage and output the reference voltage, the battery pack further comprising:
a protection circuit configured to: i) receive the reference voltage from the BMS, ii) generate an output voltage having a predetermined potential in response to the received reference voltage, and iii) output the output voltage to the BMS,
wherein the BMS is further configured to: i) compare the output voltage to the reference voltage and ii) determine whether an abnormality has occurred in the BMS based on the comparison.

2. The battery pack of claim 1, wherein the voltage measuring terminals respectively correspond to the main battery cells.

3. The battery pack of claim 1, further comprising a voltage measuring unit configured to i) measure a voltage of each of the main battery cells and ii) output the main voltage information to the voltage measuring terminals based on the measured voltages.

4. The battery pack of claim 1, further comprising an auxiliary measuring unit configured to: i) measure a voltage of the additional battery cell and ii) output the additional voltage information to the analog to digital converting terminal based on the measured voltage.

5. The battery pack of claim 4, wherein the auxiliary measuring unit comprises:
   a voltage divider including a plurality of resistors, wherein the voltage divider is configured to divide the voltage of the additional battery cell so as to generate the additional voltage information; and
   a switching element configured to electrically connect the additional battery cell to the voltage divider based on a control signal received from the BMS.

6. The battery pack of claim 1, wherein the protection circuit comprises a current mirror circuit.

7. The battery pack of claim 1, wherein the protection circuit comprises:
   a zener diode configured to suppress power received by the protection circuit; and
   a pair of resistors connected in series between the ends of the zener diode and configured to divide the voltage across the zener diode into the output voltage.

8. A battery pack, comprising:
   a battery unit including a plurality of battery cells;
   a battery management system (BMS) configured to: i) control charging and discharging of the battery unit, ii) generate a reference voltage, and iii) output the reference voltage; and
   a protection circuit configured to: i) receive the reference voltage from the BMS, ii) generate an output voltage having a predetermined potential in response to the received reference voltage, and iii) output the output voltage to the BMS,
   wherein the BMS is configured to: i) compare the reference voltage to the output voltage, ii) determine whether the reference voltage has changed based on the comparison, and iii) determine whether an abnormality has occurred in the BMS based on whether the reference voltage has changed.

9. The battery pack of claim 8, wherein the protection circuit comprises a current mirror circuit.

10. The battery pack of claim 8, wherein the protection circuit includes:
    a zener diode configured to suppress power received by the protection circuit; and
    a pair of resistors connected in series between the ends of the zener diode and configured to divide the voltage across the zener diode into the output voltage.

11. The battery pack of claim 8, wherein the battery unit includes a plurality of main battery cells and an additional battery cell.

12. The battery pack of claim 11, wherein the BMS comprises:
    at least one voltage measuring terminal configured to receive main voltage information from the main battery cells; and
    an analog to digital converting terminal configured to receive additional voltage information from the additional battery cell.

13. The battery pack of claim 12, wherein the at least one voltage measuring terminal comprises a plurality of voltage measuring terminals respectively corresponding to the main battery cells, the number of voltage measuring terminals being the same as the number of the main battery cells.

14. The battery pack of claim 12, further comprising a voltage measuring unit configured to: i) measure a voltage of each of the main battery cells and ii) output the main voltage information to the voltage measuring terminal based on the measured voltages.

15. The battery pack of claim 12, further comprising an auxiliary measuring unit configured to: i) measure a voltage of the additional battery cell and ii) output the additional voltage information to the analog to digital converting terminal based on the measured voltage.

* * * * *